Sept. 7, 1926.  
F. J. WATT  
1,598,948  
CARBURETOR FLOAT VALVE MECHANISM  
Filed Jan. 20, 1923
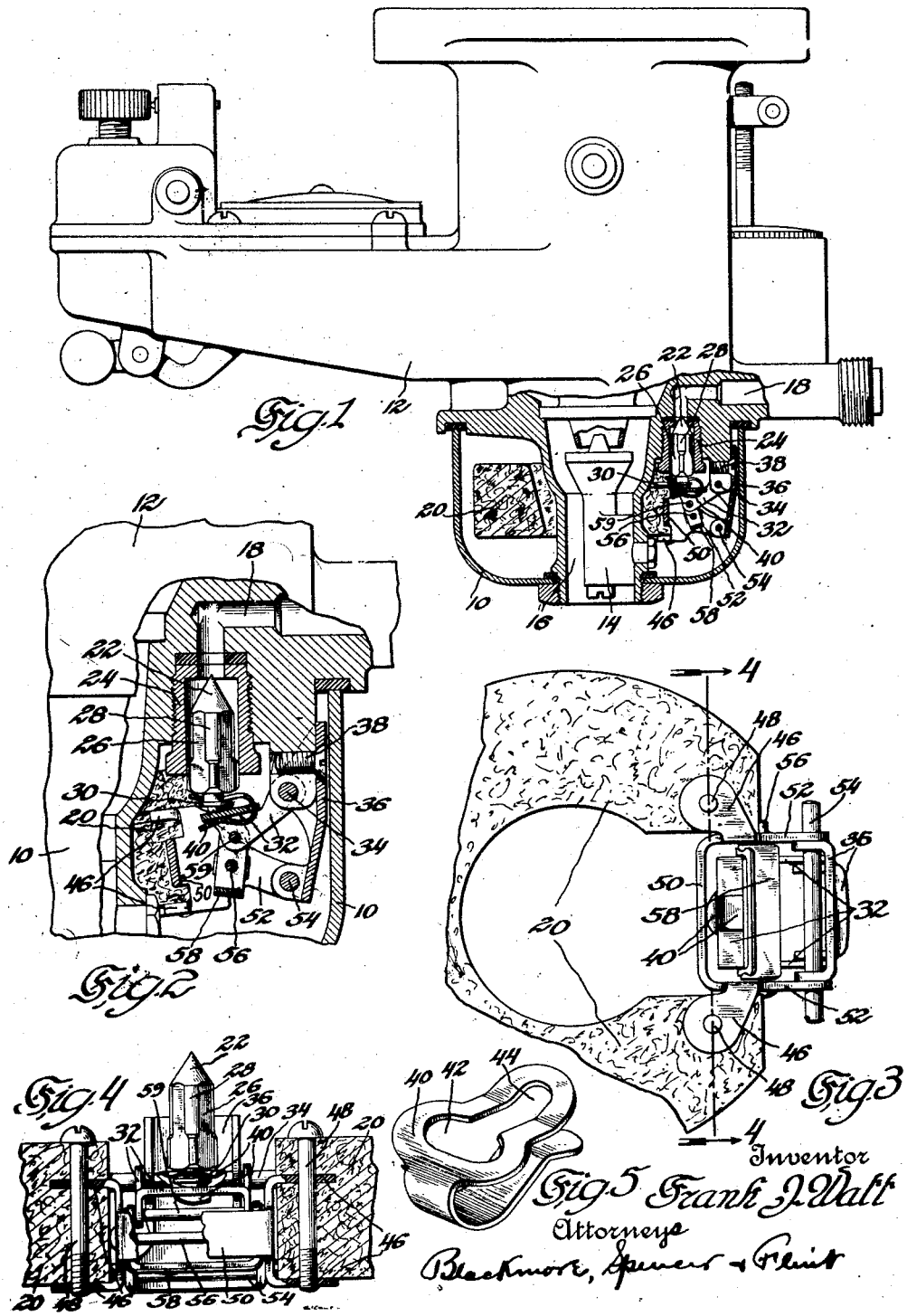
Inventor
Frank J. Watt
Attorneys
Blackmore, Spencer & Flint Patented Sept. 7, 1926.

1,598,948

UNITED STATES PATENT OFFICE.

FRANK J. WATT, OF DETROIT, MICHIGAN, ASSIGNOR TO GENERAL MOTORS CORPORATION, OF DETROIT, MICHIGAN, A CORPORATION OF DELAWARE.

CARBURETOR-FLOAT-VALVE MECHANISM.

Application filed January 20, 1923. Serial No. 613,952.

This invention relates to float valve mechanism, and is illustrated as embodied in the carburetor of an automobile.

Devices such as automobile carburetors are subjected to vibration and to violent shocks, tending to upset the action of the float valve mechanism and to start oscillations in the float chamber. If these are permitted to affect the valve, an action similar to that of a hydraulic ram is started, causing erratic feed of the fuel. To prevent this, the float is usually arranged to operate the valve through a long lever arm, which involves comparatively slow operation of the valve with corresponding substantial differences in the level of the fuel in the float chamber.

An object of the present invention is to obtain the advantages of powerful control of the valve when it approaches its seat, and at the same time more rapidly and completely to open the valve when far enough from its seat so that such control is not needed, so that the level of the fluid in the float chamber may be maintained within narrower limits than has heretofore been considered feasible. With this object in view, the invention contemplates controlling the valve from the float by connections operating with progressively greater power, and progressively more slowly, as the valve approaches its seat, as for example by using a connecting link which is shiftable with respect to the float to change its angle of thrust as the float rises.

In the illustrated embodiment of the invention, the valve is flexibly clipped to a pivoted arm by a novel spring retainer, and the link connecting this arm with the float is arranged to form with the hinged part of the float a toggle which approaches its straightened position as the valve approaches its seat, thus operating the valve rapidly except when adjacent its seat, at which time the powerful toggle action is utilized to control it.

The above and other objects and features of the invention, including an arrangement for adjusting the connecting link and other novel combinations and improved constructions of parts, will be apparent from the following description of the particular illustrative embodiment of the invention shown in the accompanying drawings, in which:

Figure 1 is a view partly in section and partly in elevation, showing the float valve mechanism assembled in a carburetor;

Figure 2 is a view corresponding to part of Figure 2, but with the parts in different positions;

Figure 3 is a bottom plan view of the float and the connections from the float to the valve;

Figure 4 is a section generally on the line 4—4 of Figure 3; and

Figure 5 is a perspective view of the novel valve retainer.

In the arrangement shown in Figure 1, the float chamber 10 is secured to a carburetor casing 12, with the fuel nozzle 14 and air inlet 16 arranged centrally thereof, and with a passage 18 for the admission of fluid to the float chamber. A float 20 is provided to control the level of fluid in the float chamber by opening and closing a needle valve 22, having a seat formed in the bottom of a bushing 24 which serves as a guide for the skirt 26 of the valve. The valve is provided with a stem 28 having a rounded end 30 forming a head and a restricted neck adjacent thereto. The valve is supported by engagement of rounded end 30 with the cross portion of a U-shaped arm 32, pivoted on a pin 34 carried by a bracket 36 held by a tap screw 38, the valve being flexibly connected to the arm by a novel spring retainer or clip 40 having an opening 42 for the passage of head 30 and an adjacent notch 44 to engage the restricted neck of the valve stem.

The float is pivoted to bracket 36 by a hinge member, having two pairs of arms 46 attached to the float by screws 48 and connected by a cross portion 50, and a pair of arms 52 mounted on pin 54, which is carried by bracket 36 and which is parallel to pin 34. This hinge member carries a pin 56, parallel to pins 34 and 54, and on which is pivotally mounted a U-shaped link 58 pivoted at its opposite ends to arm 32 by a cross pin 59, and which is arranged to change its angle of thrust as the valve approaches its seat.

It will be observed that link 58 and arms 52 practically constitute a toggle, which operates arm 32 rapidly when the valve is open (Fig. 2), and which approaches its straightened position as the valve approaches its seat (Fig. 1), thus closing the valve progressively more slowly and with progressively greater power and controlling it effectively regardless of shocks and vibrations. Bracket 36 is of sheet metal, which can be bent to change the relative positions of pins 34 and 54 and thus adjust the extent to which the toggle approaches its straightened position. The flexible connection provided by retainer 40 permits the valve to adjust its position to conform to bushing 24 and the valve seat formed therein.

While one illustrative embodiment of my invention has been described in detail, it is not my intention to limit its scope thereby, or otherwise than by the terms of the appended claims.

I claim:

1. Float valve mechanism comprising, in combination, a valve, a hinged float and a valve-operating arm having parallel fulcrum pins, a cross link connecting the float and said arm in such a manner as to turn relatively to the float to change its angle of thrust as the float rises, and a bracket for the pins which can be bent to adjust their relative positions.

2. Float valve mechanism comprising, in combination, a bendable bracket having two parallel fulcrum pins, a float hinge mounted on one pin, a valve-operating arm mounted on the other pin, and a toggle link connecting the hinge and the arm.

3. Float valve mechanism comprising, in combination, a float, a valve, a valve-operating arm connected to the float, and a retainer flexibly connecting the valve to the arm.

4. Float valve mechanism comprising, in combination, a float valve having a rounded outer end and a restricted neck, a supporting arm on which the rounded end rests, and a spring retainer engaging the neck and flexibly connecting the valve and arm.

5. A retainer for a float valve, made of spring metal bent into U-shaped form, with an opening for the head of a valve and a connected notch for the neck of the valve.

6. A carburetor with a fuel chamber, a fuel nozzle leading from said chamber and an adjacent air inlet, a float in the fuel chamber, a valve seat in the top of the fuel chamber, and a valve shiftable toward and from the seat to control the flow of fuel to the chamber, and having, in combination therewith, a hinge arm for the float and a valve-operating arm moving about parallel axes, and a link connecting the float hinge and the valve-operating arm in such a manner as to turn with respect to the float to change its angle of thrust as the float rises.

7. A carburetor comprising a fuel chamber, a fuel inlet valve therefor, a float in said chamber, toggle mechanism connected to the float for actuating said valve in response to movements of said float, and means for adjusting the position of said toggle mechanism in the fuel chamber including an adjustable pivot support for one of the arms of the toggle.

8. A carburetor comprising a fuel chamber, a fuel inlet valve therefor, a float in said chamber, a pivoted arm supporting the float, a pivoted valve actuating arm flexibly connected to the valve and means connecting the float supporting arm on the side of the pivot toward the float to the valve actuating arm and adapted to operate the valve more slowly and with greater power as the valve approaches its seat.

9. Structure as in claim 8, the connecting means comprising a link between the float arm and the valve actuating arm and forming with the former a toggle.

In testimony whereof I affix my signature.

FRANK J. WATT.